(12) United States Patent
Bellero et al.

(10) Patent No.: US 7,584,626 B2
(45) Date of Patent: Sep. 8, 2009

(54) AIR-CONDITIONING SYSTEM FOR A VEHICLE, IN PARTICULAR AN INDUSTRIAL VEHICLE, AND VEHICLE EQUIPPED WITH SAID SYSTEM

(75) Inventors: Domenico Bellero, Santena (IT); Mariano Turco, Mondovi' (IT)

(73) Assignee: IVECO S.p.A., Turin (IT)

( * ) Notice: Subject to any disclaimer, the term of this patent is extended or adjusted under 35 U.S.C. 154(b) by 0 days.

(21) Appl. No.: 11/904,460

(22) Filed: Sep. 27, 2007

(65) Prior Publication Data

US 2008/0080989 A1  Apr. 3, 2008

(30) Foreign Application Priority Data

Sep. 29, 2006  (IT)  ............................ MI2006A1867

(51) Int. Cl.
  *B60H 1/32*  (2006.01)
(52) U.S. Cl. ........................ 62/236; 62/244; 62/323.1
(58) Field of Classification Search ................ 417/374; 62/243, 323.3, 239–244, 236, 323.1
  See application file for complete search history.

(56) References Cited

U.S. PATENT DOCUMENTS

| 3,844,130 | A | * | 10/1974 | Wahnish | 62/133 |
| 4,021,214 | A | * | 5/1977 | Bush | 62/244 |
| 4,825,663 | A | * | 5/1989 | Nijjar et al. | 62/236 |
| 2003/0201097 | A1 | * | 10/2003 | Zeigler et al. | 165/240 |
| 2003/0209373 | A1 | * | 11/2003 | Egami et al. | 180/53.8 |
| 2004/0187506 | A1 | * | 9/2004 | Iwanami et al. | 62/236 |
| 2005/0284675 | A1 | * | 12/2005 | Sanchen | 180/65.2 |

FOREIGN PATENT DOCUMENTS

| DE | 197 38 250 A1 | 3/1999 |
| EP | 1 221 391 A2 | 7/2002 |
| EP | 1 249 360 A1 | 10/2002 |
| EP | 1 362 726 A2 | 11/2003 |
| EP | 1 602 515 A1 | 12/2005 |

* cited by examiner

*Primary Examiner*—William E Tapolcai
(74) *Attorney, Agent, or Firm*—Stetina Brunda Garred & Brucker

(57) ABSTRACT

Air-conditioning system for a vehicle, preferably an industrial vehicle, said system comprising:
  a main internal combustion engine (1);
  an alternating current electric machine (7) suitable to function as a motor and/or generator;
  a refrigeration circuit (2) comprising a compressor (3), suitable to be driven by said main engine or by said electric machine;
  a source (8) of electric power suitable to supply said electric machine;
  three clutches (10, 11, 12) suitable for independently connecting/disconnecting said main engine to said compressor, to said electric machine or said compressor to said electric machine.

Vehicle equipped with said system.

9 Claims, 1 Drawing Sheet

AIR-CONDITIONING SYSTEM FOR A VEHICLE, IN PARTICULAR AN INDUSTRIAL VEHICLE, AND VEHICLE EQUIPPED WITH SAID SYSTEM

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

The present invention relates to an air-conditioning system for a vehicle, in particular an industrial vehicle, also capable of functioning during the stops of the vehicle.

BACKGROUND

In the field of air-conditioning for industrial vehicles there is a particular need for air-conditioning in the cab even during the stops of the vehicle. Various systems have been proposed for driving the compressor of the refrigeration circuit; when the vehicle is running, said compressor can be driven by the vehicle's main engine, or by an electric motor, which can be operated for example by the current supplied by the usual vehicle's batteries, or by another source of electric power. Systems have been proposed featuring an auxiliary generator set comprising an internal combustion engine of adequate power, which runs on the same fuel as the vehicle's main engine. Indeed, the vehicle's batteries are usually insufficient to guarantee operation in case of prolonged stops it must be avoided to completely discharge the batteries.

However, the systems according to the known art have drawbacks in that it is not easy to reconcile the dimensions of the various elements with an adequate power of the electric motor, in order to guarantee adequate air-conditioning even in the most critical conditions when the main engine is not running. Furthermore, it would be desirable to achieve a better exploitation of the electric machine to drive the compressor, especially if used with batteries or ultracapacitors.

BRIEF SUMMARY

The above mentioned problems have now been overcome according to the present invention with an air-conditioning system for a vehicle, preferably an industrial vehicle, said system comprising:

a main internal combustion engine;

an alternating current electric machine suitable to function as an electric motor and as a current generator;

a refrigeration circuit comprising a compressor, suitable to be driven by said main engine or by said electric machine;

a source of electric power suitable to supply said electric machine;

three clutches suitable for independently connecting/disconnecting said main engine to said compressor, to said electric machine or said compressor to said electric machine.

According to a preferred embodiment of the invention said electric machine is a "brushless" machine, i.e. an alternating current machine featuring no brushes, such as an asynchronous machine or a permanent magnet synchronous machine, whose rotor does not require any electrical connection with other components.

The system preferably comprises means suitable to independently connect/disconnect said main engine and said compressor, and said electric machine or said compressor and said electric machine.

The source of electric power can be, for example, a generator comprising an auxiliary internal combustion engine, a battery, in particular a high-efficiency battery, a fuel cell.

According to another embodiment of the invention, speed reducing means are interposed between the main engine, electric machine and compressor, for example gearing means.

In particular the present invention relates to that contained in the appended claims.

BRIEF DESCRIPTION OF THE DRAWINGS

The present invention will now be illustrated by means of the following detailed description of preferred but not exclusive embodiments, provided merely by way of example, with the help of appended FIG. 1, showing diagram of an air-conditioning system according to a possible embodiment of the present invention.

DETAILED DESCRIPTION

Figure 1:
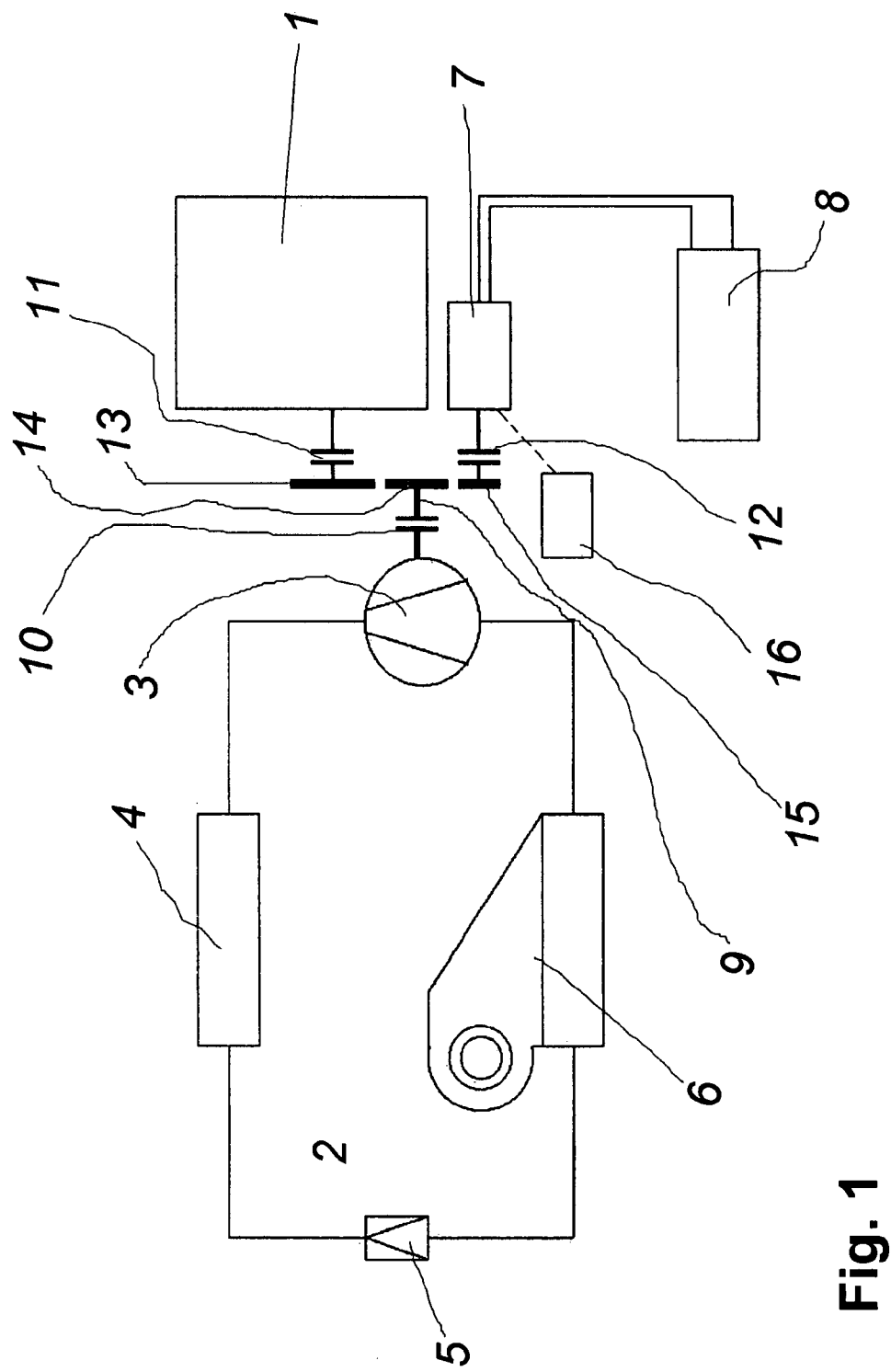

With reference to FIG. 1 the diagram of an air-conditioning system according to an embodiment of the invention is illustrated.

The system comprises a main internal combustion engine 1, which may be a diesel engine, and is the propulsion engine of a vehicle, for example an industrial vehicle.

A refrigeration circuit, of known type, comprises a compressor 3, a condenser 4, connected to the delivery side of the compressor 3, expansion means for a cooling fluid, such as an ordinary expansion valve 5, an evaporator 6, connected to the intake side of the compressor, so as to close the circuit.

The circuit is suitable to be flown by a cooling fluid; the evaporator 6 is suitable to remove heat from the cab of a vehicle thanks to the evaporation of said fluid; this can be achieved in a known way.

The system comprises the alternating current electric machine 7, preferably a brushless synchronous or asynchronous machine; it can also function as a generator. According to a possible embodiment, the compressor 3 can be connected to or disconnected from the shaft 9, by means of specific means, such as the clutch 10. By means of the clutches 11 and 12 respectively, the main engine 1 and the electric machine 7 can also be connected to or disconnected from the shaft 9. The three above-mentioned clutches can be of any suitable type, for example electromagnetic clutches.

Transmission means may be provided. These may be reducing means, as described above; for example a couple of gears 13 and 14 between the engine 1 and shaft 9 and a couple of gears 14 and 15 between the shaft 9 and electric machine 7 are used to achieve a suitable revolution speed ratio between the engine and the compressor, between the electric machine the compressor and between the engine 1 and the electric machine, in particular if the latter is used as a generator. However, any other known type of transmission and/or reducing means can be used, such as for example systems of belts and pulleys. With clutches 10 and 11 closed the compressor can be driven by the engine 1 when the vehicle is running or, by closing clutches 10 and 12 it can be driven by the electric machine when the engine 1 is not running, by opening clutch 11, for air-conditioning during vehicle's stops. With clutches 11 and 12 closed, a connection can be made between the engine 1 and electric machine 7, both when the compressor is running or not, by operating clutch 10. This allows the electric machine to be used as a generator or, anyway, as an engine brake.

A source 8 of electric power is also provided to supply the electric machine 7. There are preferably means, such as inverters, for example transistor inverters, suitable to convert the alternating current into direct current or vice versa and/or to vary its frequency thereof, in order to operate the electric machine both as a motor and as a generator and engine brake, and thus also to supply it by means of the batteries if desired (="motor" function), or to store the energy that is generated (="generator" function). Electric machines already equipped with such devices are known in the art. These can advantageously be used in a system according to the present invention. In case of a generator comprising an auxiliary internal combustion engine as the source of electric power, and of an electric machine suitable to function as a generator, batteries of a suitable type capable of storing the energy generated by the electric machine must also be provided in addition to the generator.

According to a possible embodiment, the electric machine, the above-mentioned clutches and any means for converting direct current into alternating current or vice versa, can be controlled by a specific control unit 16, which can also comprise an electronic module.

According to an embodiment of the present invention, the electric machine can thus be used as a generator, for example during deceleration or down slopes, in particular those in which the main engine is not fed with fuel. It can also be used to charge the vehicle's ordinary batteries, especially if the auxiliary power source comprises a combustion engine or fuel cell. Or it also can charge high-efficiency batteries if these are the power source, which constitutes a preferred embodiment of the invention. Otherwise high-efficiency batteries can be provided in addition to a different type of power source.

Different types of high-efficiency batteries are known in the automotive field, which can also be able to absorb high current peaks; examples are NiCd batteries, lithium batteries, sodium nickel chloride batteries, such as batteries sold under the name of Zebra by ZEV, and others.

The ratios between the revolution speed of the various elements are chosen according to their characteristics, and to optimize the torque transmitted to the various elements. For instance, in the case shown in FIG. 1, a ratio of between 1.3 and 1.4 between the shaft 9 and the main engine can be chosen, for example 1.37, and a ratio of between 1.7 and 2 between the electric machine and the shaft 9 can be chosen, for example 1.85.

Thus, for a main engine with a maximum speed of 2100 rpm, which may apply for a diesel engine for an industrial vehicle, the maximum speed of the electric machine when used as a generator can be approx. 5300 rpm, and the speed of the compressor 2877 rpm. The power of the electric machine used as a motor can be more than 1 kW, for example a 1.5 kW machine has been found to be suitable for air-conditioning even in severe conditions. According to a possible embodiment the machine can function at voltages typical of those of the commercial distribution network, for example 220-250 V, which means it can be used when the vehicle is parked also by connecting to the commercial network.

In the case of high-efficiency batteries as a source of electric power, different steps during the operation of the main engine can be foreseen, whereby the electric machine charges the batteries, for with a subsequent use when the main stops; if found necessary this can even happen when the engine is consuming fuel.

The electric machine can also be used to charge the customary batteries of the vehicle.

According to a preferred embodiment, control unit 16 may control the charge status of the high-efficiency batteries, so as to allow to interrupt electric energy generation, or to allow to charge the vehicle's batteries. For instance, a double inverter may be provided, in order to supply energy at different voltages, for example 220 V and 24 V, respectively to charge the high-efficiency batteries and the vehicle's customary batteries, and to feed the electric machine by means of the auxiliary batteries, when needed (the common kinds of high-efficiency batteries, indeed, run on common net voltages). The electric machines may be equipped with an inverter, as said above, or an inverter may be integrated in the high-efficiency battery; in fact, commercial kinds of such batteries are already provided with inverters. This, and other solutions may be adopted according to specific needs.

The use of an alternating current machine, in particular a three-phase machine, has been found advantageous with regard to dimensions and efficiency, also in case of high power/torque machines, as exemplified above; this unlikely with respect to prior art solutions adopted direct current machines, with rectifiers, even with an auxiliary alternating current generator.

The control unit 16, for example, can be suitable to regulate the power delivered by the electric machine under different conditions, according to the commands, and to control the various couplings, on the basis of predetermined logic. Control of the power supplied by the electric machine and operation of the clutches may be so quick to allow very favourable control logics. For example, the electric machine may be used as a generator during travel, under conditions when a braking torque is required to decelerate the engine, such as during decelerations or descents, and can either be switched off or supply torque, particularly when the compressor is running. It can also work as a generator during travel, even during short interruptions of compressor's operation (for instance those forced by the anti-frost sensor), absorbing the engine power made available by the turning off of the compressor. The three clutches allow to implement all possible desired connections, without uselessly driving in rotation the electric machine, when inoperative (both as motor and as generator), even when the compressor is running, driven by the engine. Thus friction and fuel consumption are reduced and the torque required to the engine may be reduced, under critical conditions, such as when the vehicle is started, when pollution is more likely to be generated. A more prompt and easier operation of the electric machine is furthermore possible, in particular during operation as generator when the vehicle is travelling, during discontinuous travel and compressor's operation, so that torque is absorbed only when desired.

The invention also relates to a vehicle, in particular an industrial vehicle provided with the system described above.

What is claimed is:

1. Air-conditioning system for a vehicle, said system comprising:
   a main internal combustion engine (1);
   an alternating current electric machine (7) suitable to function both as a motor and as a generator;
   a refrigeration circuit (2) comprising a compressor (3), suitable to be driven by said main engine or by said electric machine;
   a source (8) of electric power suitable to supply said electric machine;

a first clutch (10) for independently connecting/disconnecting said main engine to said compressor or said compressor to said electric machine;

a second clutch (11) for independently connecting/disconnecting said main engine to said electric machine or to said compressor; and a third clutch (12) for independently connecting/disconnecting said electric machine to said main compressor or to said main engine;

wherein when the first (10) and the second clutches (11) are closed, the compressor is driven by the engine (1) when the vehicle is running;

wherein when the first (10) and the third clutches (12) closed, the compressor is driven by the electric machine when the vehicle is not running;

wherein reducing means (13, 14, 15) are interposed between said main engine (1), said electric machine and said compressor, said reducing means comprising a first gear (14) connect to a shaft (9) of said compressor, a second electric machine (7), said first ear (14) being interposed between said second (13) and said third gear (15) so as to provide a revolution speed ratio between said engine and said compressor, between said electric machine and said compressor and between said engine and said electric machine.

2. System according to claim 1, wherein said speed ratio between said shaft (9) of said compressor and said main engine is between 1.3 and 1.4.

3. System according to claim 2, wherein said speed ratio between said electric machine and said shaft (9) of said compressor (3) is between 1.7 and 2.

4. System according to claim 1 said electric machine is a "brushless" machine.

5. System according to claim 1, wherein said clutches are electromagnetic clutches.

6. System according to claim 1, wherein said source of electric power is a generator comprising an auxiliary internal combustion engine.

7. System according to claim 1, wherein said source of electric power comprises a high-efficiency battery.

8. System according to claim 1, wherein said source of electric power comprises a fuel cell.

9. System according to claim 1 wherein the vehicle is an industrial vehicle.

\* \* \* \* \*